United States Patent [19]

Aisawa

[11] Patent Number: 5,581,421
[45] Date of Patent: Dec. 3, 1996

[54] METHOD FOR DRIVING STEPPING MOTOR FOR HEAD SEEK IN DISK DRIVE DEVICE

[75] Inventor: Nobuhiro Aisawa, Saitama-ken, Japan

[73] Assignee: Canon Denshi Kabushiki Kaisha, Saitama-ken, Japan

[21] Appl. No.: 7,174

[22] Filed: Jan. 21, 1993

[30] Foreign Application Priority Data

Jan. 30, 1992 [JP] Japan .................................. 4-014442
Feb. 21, 1992 [JP] Japan .................................. 4-070094

[51] Int. Cl.⁶ ............................................... G11B 5/596
[52] U.S. Cl. ............................... 360/78.13; 318/696
[58] Field of Search ........................... 360/78.13, 78.04; 318/696, 685

[56] References Cited

U.S. PATENT DOCUMENTS 4,959,738  9/1990  Fujii et al. ........................ 360/78.13
5,060,093  10/1991 Kawahara ........................ 360/78.13
5,196,777  3/1993  Kataoka ............................ 318/696
5,264,771  11/1993 Kawauchi .......................... 318/696

FOREIGN PATENT DOCUMENTS 0147993  10/1985  European Pat. Off. .
0112272  5/1987   Japan .................................. 360/78.13

Primary Examiner—Aristotelis Psitos
Assistant Examiner—James L. Habermehl
Attorney, Agent, or Firm—Robin, Blecker, Daley and Driscoll

[57] ABSTRACT

In a method for driving a head-seek stepping motor of a disk drive device of the kind performing a head seek to move a recording or reproducing head in a radial direction of a disk-shape recording medium by driving the stepping motor according to pulses of a step signal, a period of time for exciting the stepping motor at one time in response to each pulse of the step signal is set at a length of time which is shorter than a pulse interval of the step signal and which is a minimum length of time necessary for the head seek when the pulses of the step signal are continuously inputted for a continuous head seek, and a re-exciting action is performed on the stepping motor in its last excited phase for a given period of time at the end of the continuous head seek.

18 Claims, 7 Drawing Sheets

METHOD FOR DRIVING STEPPING MOTOR FOR HEAD SEEK IN DISK DRIVE DEVICE

BACKGROUND OF THE INVENTION

1. Field of the Invention

This invention relates to a method for driving a head-seek stepping motor of a disk drive device for recording or reproducing information, which is arranged to perform a head seek action by moving recording/reproducing heads over a disk-shaped recording medium in the radial direction of the disk-shaped recording medium.

2. Description of the Related Art

A floppy disk drive device (hereinafter referred to as FDD) is known as a typical disk drive device of the above-stated kind. The FDD is arranged as described in outline below with reference to FIG. 1

In FIG. 1, reference numeral 1 denotes a flexible magnetic disk called a floppy disk (a disk-shaped magnetic recording medium). The magnetic disk 1 is mounted on a spindle 2 and is driven to rotate by a disk driving motor 3. Magnetic heads 4a and 4b are transducers which are mounted on a carriage 5 and arranged to be in pressed contact with both surfaces of the magnetic disk 1 for recording and reproduction of information on and from the magnetic disk 1. The carriage 5 is movable in the directions of arrows "a" and "b" along the radial direction of the magnetic disk 1. The magnetic heads 4a and 4b are thus arranged to be movable toward both the inner and outer circumferences of the magnetic disk 1 for a so-called head seek, which hereinafter means positioning a head at a designated track position on a magnetic disk. The carriage 5 is arranged to be driven by a stepping motor 6 through a head seek mechanism which is not shown but consists of a lead screw, a steel belt, etc.

In performing a recording or reproducing action, the magnetic disk 1 is driven to rotate by the disk driving motor 3 under the control of a control circuit which is not shown. Meanwhile, the carriage 5 is driven by the stepping motor 6 to move in the direction of arrow "a" or "b". The magnetic heads 4a and 4b are thus moved to a desired track position on the magnetic disk 1. The recording or reproduction is then performed in or from the track on the magnetic disk 1.

The conventional method of driving the stepping motor 6 for the head seek of the above-stated FDD is described with reference to FIG. 2 as follows In FIG. 2, reference numeral 11 denotes a step signal which comes from a host system to give an instruction by one pulse at a time for one step driving of the stepping motor 6. Reference numerals 12 to 15 denote exciting signals for exciting the coil of the stepping motor 6 respectively in its phases ϕA to ϕD. The exciting signals 12 to 15 are in their excitied states when they are at high levels.

According to the conventional method, the phase transition of the stepping motor 6 is effected in response to the pulses S1 to S6 of the step signal 11 from the host system as shown in FIG. 2. An excited state is held unvaried throughout a period between one pulse of the step signal and arrival of a next pulse of the step signal. After the last (step) pulse S6, the coil of the stepping motor is excited for a certain given period, and, then, there is obtained a non-excited state, or a holding state.

However, since the excited state is maintained during the period from one pulse until arrival of a next pulse of the step signal, seeking is apt to be performed with an unnecessarily large power. This tendency becomes strong especially in cases where the step intervals are long (a slow seek speed). Therefore, the conventional method not only increases the power consumption of the stepping motor but also makes the sound of the seek large to increase the noise of operation.

SUMMARY OF THE INVENTION

It is an object of this invention to provide a method for driving a head-seek stepping motor of a disk drive device of the above-stated kind whereby the noise and the power consumption mentioned in the foregoing can be minimized and also to provide a disk drive device by which this method can be carried out.

According to a stepping-motor driving method arranged as an embodiment of the invention for a head seek to be made by the above-stated disk drive device, in performing a continuous head seek consisting of a plurality of steps, a period of time for exciting the stepping motor at one time in response to each pulse of a step signal is arranged to be shorter than a pulse interval of the step signal and limited to a minimum length of time necessary for the head seek, and, in the last excited phase thereof, the stepping motor is re-excited for a predetermined period of time at the end of the continuous head seek.

In accordance with this driving method, the head seek is never performed with an unnecessarily large power as the exciting period at one time in response to each pulse of the step signal is minimized. Further, at the end of a continuous head seek, the stepping motor is re-excited in its last excited phase to ensure adequate track position accuracy.

A disk drive device of the kind recording and reproducing information on and from a recording medium by recording/reproducing heads is arranged in accordance with this invention to vary a driving voltage applied to its driving motor according to the step intervals of an instruction signal given for a head seek to be made with the recording/reproducing heads. The invented arrangement effectively reduces the power consumption of the device as well as any noise resulting from the head seek.

The above and other objects and features of this invention will become apparent from the following detailed description of embodiments thereof taken in conjunction with the accompanying drawings.

DETAILED DESCRIPTION OF THE PREFERRED EMBODIMENTS

Figure 1:
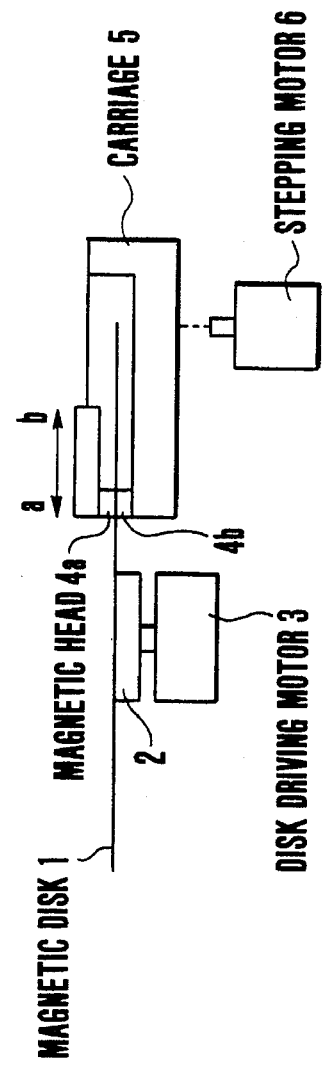
FIG. 1 is a schematic illustration showing in outline the arrangement of an FDD.
Figure 2:
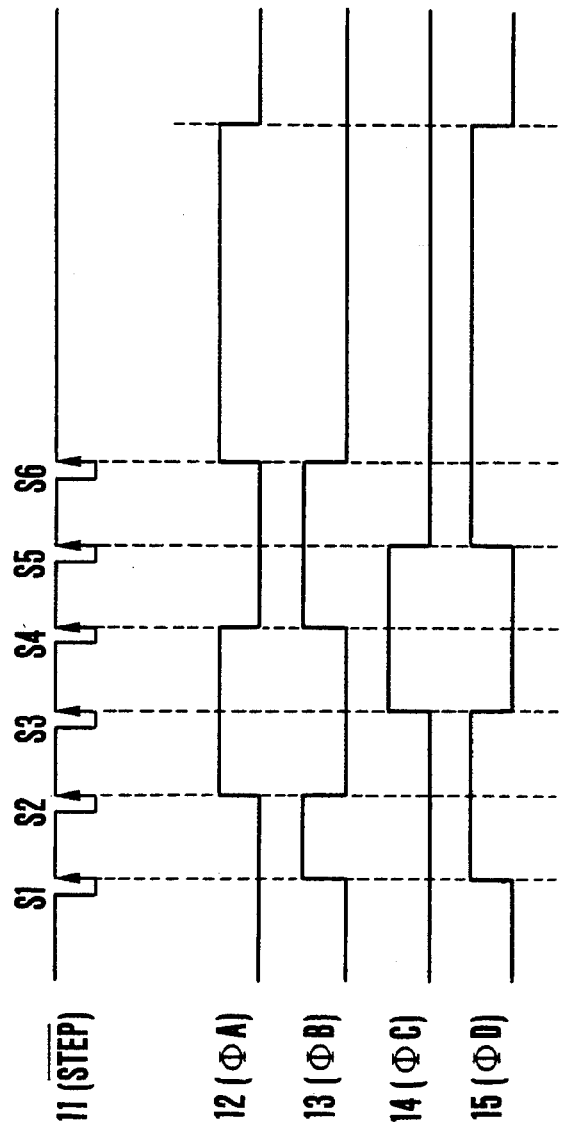
FIG. 2 shows in a timing chart the conventional method for driving the stepping motor of the FDD.

Some of the embodiments of this invention are described below by way of example with reference to the drawings. These embodiments are described as methods for driving the head-seek stepping motor of an FDD. The FDD is arranged similarly to the FDD described in outline in the foregoing with reference to FIG. 1.

EMBODIMENT I

Figure 3:
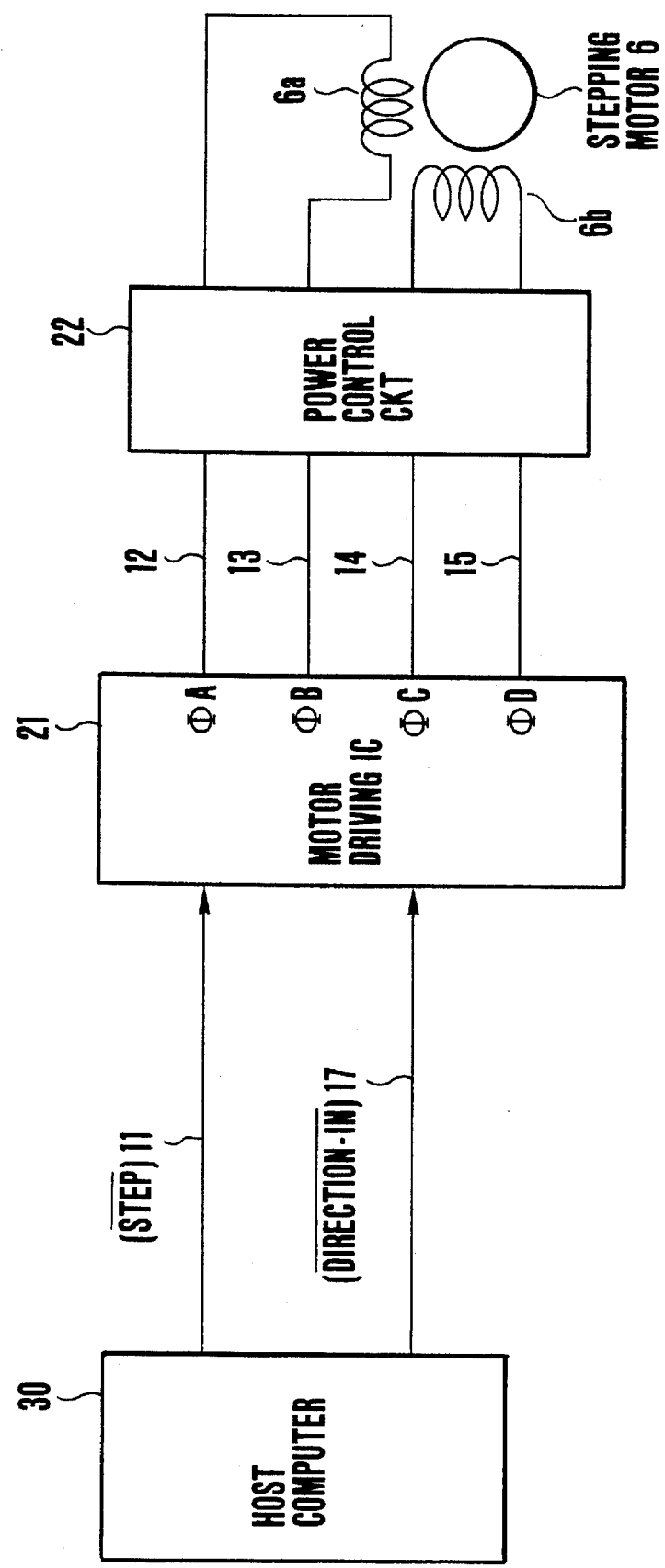
FIG. 3 is a block diagram of the arrangement of a driving control system for driving the head-seek stepping motor of an FDD by a stepping-motor driving method which is a first embodiment of this invention.

FIG. 3 shows the arrangement of a driving control system for driving a head-seek stepping motor of the FDD in accordance with the stepping-motor driving method arranged as the first embodiment of this invention.

Referring to FIG. 3, a motor driving IC 21 is of a bipolar driving type. A host computer 30 is arranged to input a step signal 11 and a direction-in signal 17 to the motor driving IC 21. The direction-in signal 17 shows the direction of the head seek. The direction is toward the inner circumference of the disk when the signal 17 is at a low level and toward the outer circumference of the disk when the signal 17 is at a high level. The motor driving IC 21 is arranged to serially generate exciting signals 12 to 15 for exciting a stepping motor 6 in its phases φA to φD one after another according to the step signal 11. The exciting sequence of the exciting signals 12 to 15 is switched from one over to another according to the level of the direction-in signal 17. A power control circuit 22 is arranged to apply currents to the coils 6a and 6b of the stepping motor 6 in accordance with the exciting signals 12 to 15. With the currents thus applied, the stepping motor 6 is driven to rotate. The rotating direction of the stepping motor 6 is changed from one direction over to the other according to the direction-in signal 17 coming from the host computer 30, so that the direction of the head seek is changed over.

The method for driving the stepping motor 6 for a continuous head seek consisting of a plurality of steps is described below with reference to FIG. 4, which is a timing chart showing a continuous head seek action consisting of six steps.

Figure 4:
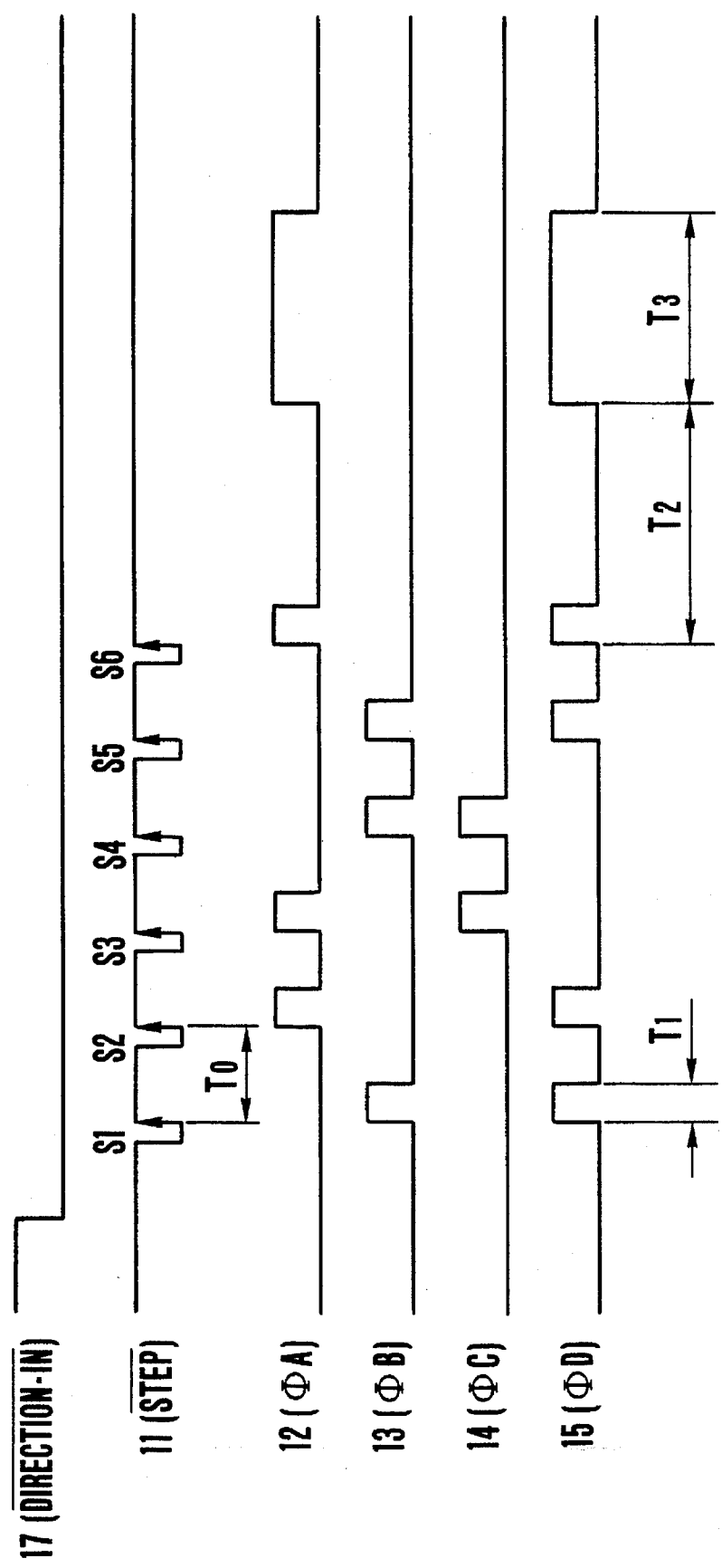
FIG. 4 is a timing chart showing a stepping-motor driving method to be carried out for a continuous head seek according to the first embodiment of this invention.

Referring to FIG. 4, the step signal 11 which is arranged to be active at its low level is inputted from the host computer 30. A stepwise exciting action is performed with the exciting signals 12 to 15 for the phases φA to φD of the stepping motor 6 serially outputted in response to the rises of pulses S1 to S6 of the step signal 11. When the first pulse S1 of the step signal 11 is inputted, the excited state of each of the phases φA to φD of the stepping motor 6 caused by each of the exciting signals 12 to 15 changes from a previous phasic state (not shown) to a phasic state shifting either toward the inner circumference or toward the outer circumference of the disk according to the state of the direction-in signal 17.

However, the excited state obtained in response to the pulse S1 continues only for a period of time T1 which is shorter than a period T0 between the pulses S1 and S2. Then, a non-excited state is obtained before the next pulse S2 is inputted. The excited and non-excited states recur in the same manner for the pulses S2 to S6. The time T1 is set at a minimum period of time required for the head seek.

The pulse S6 of the step signal is considered to be the last step pulse for the continuous seek if no further pulse of the step signal occurs during a given period of time T2 following the input of the pulse S6. The stepping motor 6 is then excited again in the last exciting phase for a period of time T3. The re-exciting action is performed for adequate track position accuracy. The time T3 for this purpose is longer than the time T0.

According to this driving method, the period of time T1 for exciting the stepping motor 6 at one time for each pulse of the step signal is shorter than the pulse interval T0 and is a minimum length of time necessary for the head seek. Unlike the conventional driving method, no unnecessarily large power is used for the head seek. Any noise caused by a continuous head seek thus can be minimized. The power consumption by the stepping motor 6 also can be held low. It is another advantage that the accuracy of track position is assured by exciting the stepping motor 6 again in its last excited phase for a given period of time at the end of the continuous head seek.

EMBODIMENT II

Figure 5:
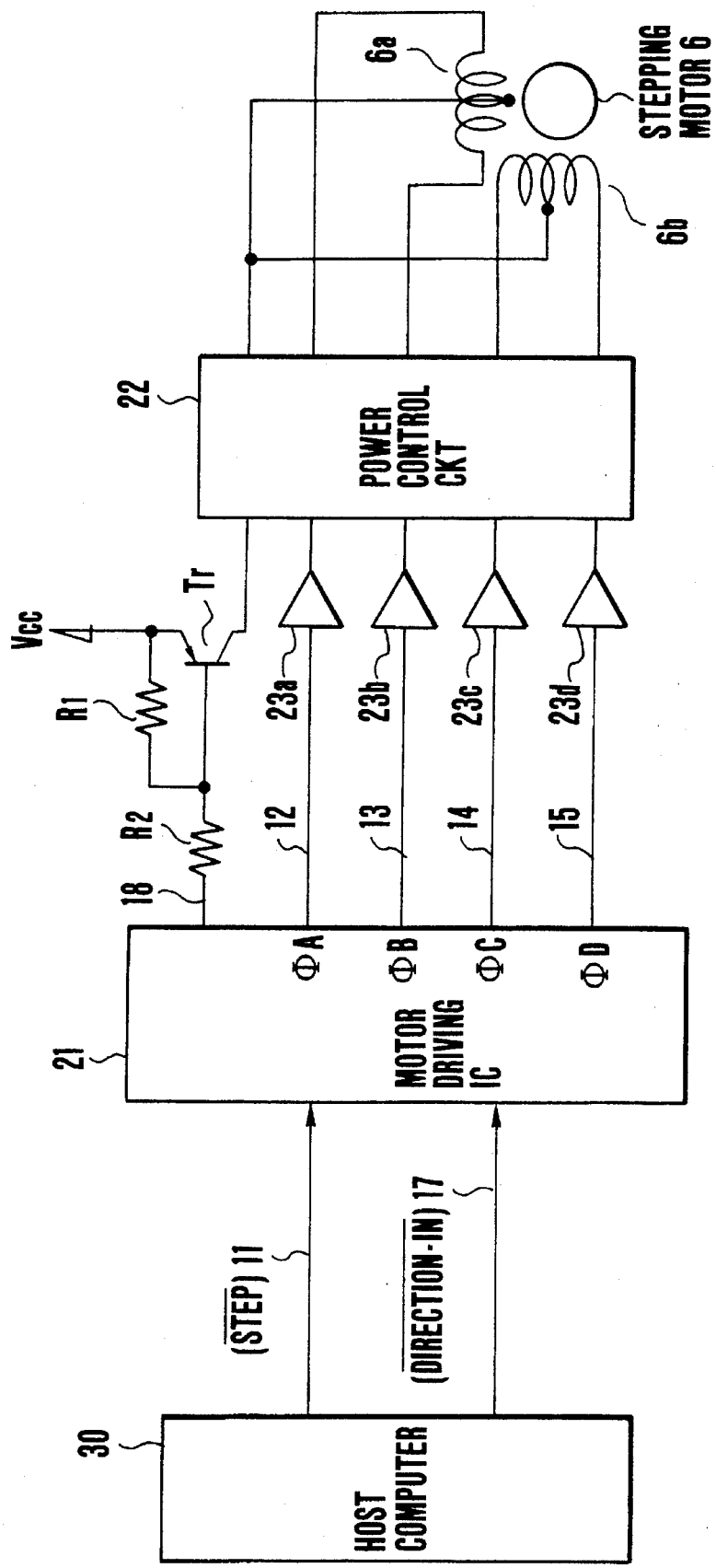
FIG. 5 is a block diagram of the arrangement of a driving control system for driving a head-seek stepping motor according to a stepping-motor driving method which is a second embodiment of this invention.

FIG. 5 shows the arrangement of a driving control system for driving a head-seek stepping motor in accordance with a stepping-motor driving method which is arranged as a second embodiment of this invention.

Referring to FIG. 5, the second embodiment differs from the first embodiment shown in FIG. 3 in the following points. The coils 6a and 6b of the stepping motor 6 are in the form of bifilar windings respectively having center taps. The motor driving IC 21 is arranged to drive the stepping motor 6 by unipolar driving to move it two phases per step. Further, buffers 23a to 23d are inserted respectively in signal lines which are arranged for inputting the exciting signals 12 to 15 for the respective phases φA to φD to the power control circuit 22. Further, electric power is supplied to the power control circuit 22 via a switching circuit which consists of a transistor Tr and resistors R1 and R2 according to a step one-shot signal 18 outputted from the motor driving IC 21. The step one-shot signal 18 is arranged to be triggered by the rise of each pulse of the step signal 11 and to remain at an active low level for a given period of time.

The manner in which the stepping motor 6 is driven at the time of a continuous head seek according to this embodiment is described below with reference to FIG. 6 which is a timing chart.

Figure 6:
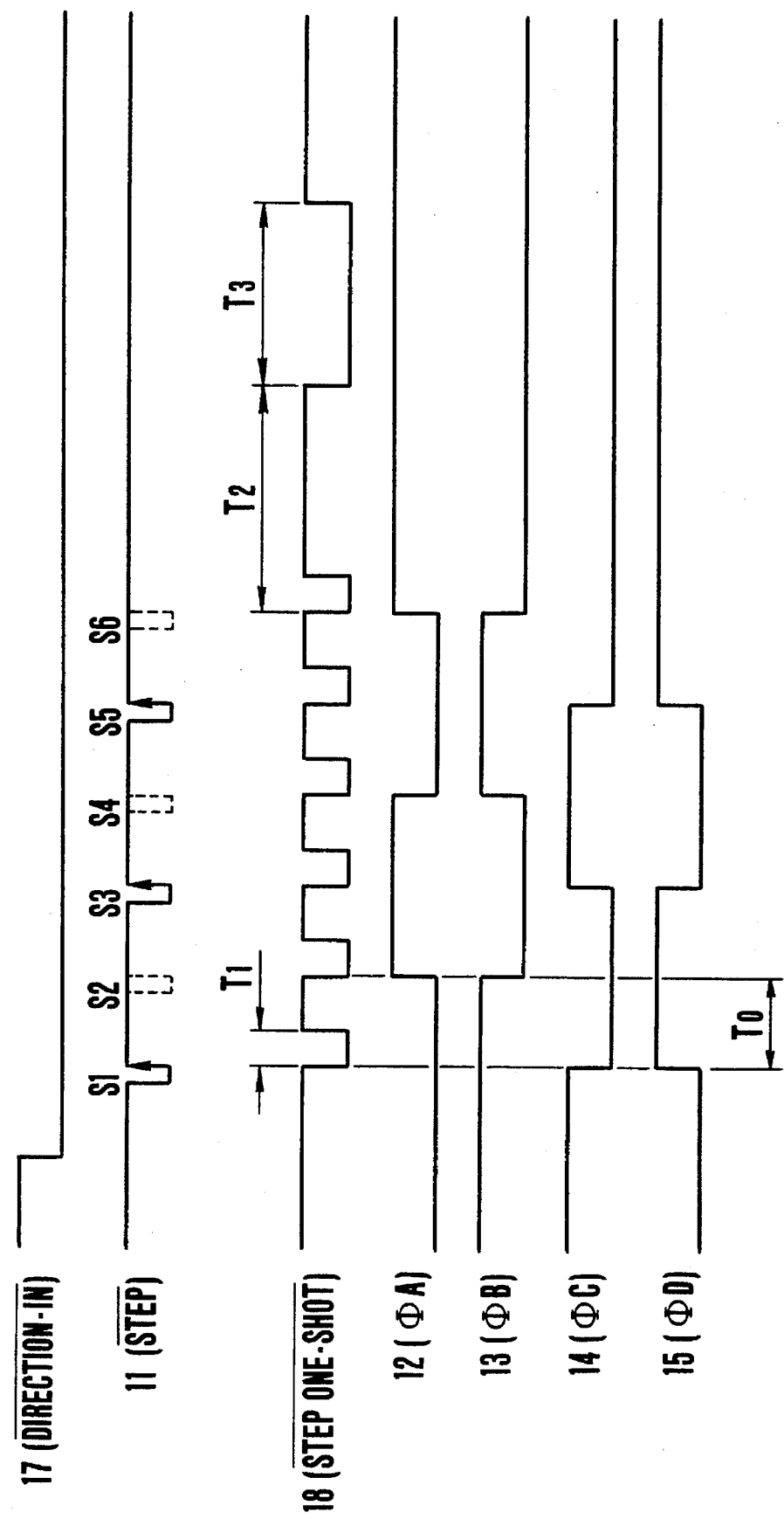
FIG. 6 is a timing chart showing a stepping-motor driving method to be carried out for a continuous head seek according to the second embodiment of this invention.

As shown in FIG. 6, the excited state in each phase of the stepping motor 6 is caused to vary by two phases by the exciting signals 12 to 15 in response to the every other pulses S1, S3 and S5 of the step signal 11 from the host computer 30. In this case, the other pulses S2, S4 and S6 become additional pulses. The supply of electric power to the stepping motor 6 is controlled by the step one-shot signal 18.

When the first pulse S1 of the step signal 11 is inputted, the excited states of the phases φA to φD caused by the exciting signals 12 to 15 are shifted from previous states by one step in the direction indicated by the direction-in signal 17. At this time, the step one-shot signal 18 becomes active only for a period of time T1. A current is applied to the coil 6a or 6b of the stepping motor 6 to actually excite the coil only during this period. In other words, in actuality, one exciting time for the pulse S1 is the period of time T1. Like in the case of the first embodiment, the period of time T1 is shorter than a pulse interval T0 of the step signal 11 and is limited to a minimum exciting time necessary for the head seek.

After the lapse of the pulse interval T0, the additional pulse S2 of the step signal 11 is generated and the stepping motor 6 comes to a next phase state. The same processes are repeated for each of other pulses S3 and S5. With the additional pulse S6 generated after the lapse of the interval T0 following the generation of the pulse S5, if no further pulse of the step signal 11 is inputted during a given period of time T2, the pulse S6 is considered to be the last pulse. Then, the last excited phase is excited again by making the step one-shot signal 18 active for a period of time T3.

With the second embodiment arranged as described above, the same advantageous effects as those of the first embodiment are attainable. While the first embodiment is arranged to move the stepping motor one phase (hereinafter referred to as one-phase feeding) per step by bipolar driving, the invention can be practiced with the driving method of two-phase feeding per step by unipolar driving like in the case of the second embodiment. This method of course can be changed to a method of one-phase feeding per step. Further, in the cases of the first and second embodiments, the power supply is kept off while the driving control system is in a holding state. However, it is conceivable to have excitation carried on with a low voltage in the holding state. Further, the stepping-motor driving method described above is applicable not only to an FDD but also to other disc drive devices of the kind performing a head seek by driving a stepping motor.

EMBODIMENT III

Figure 7:
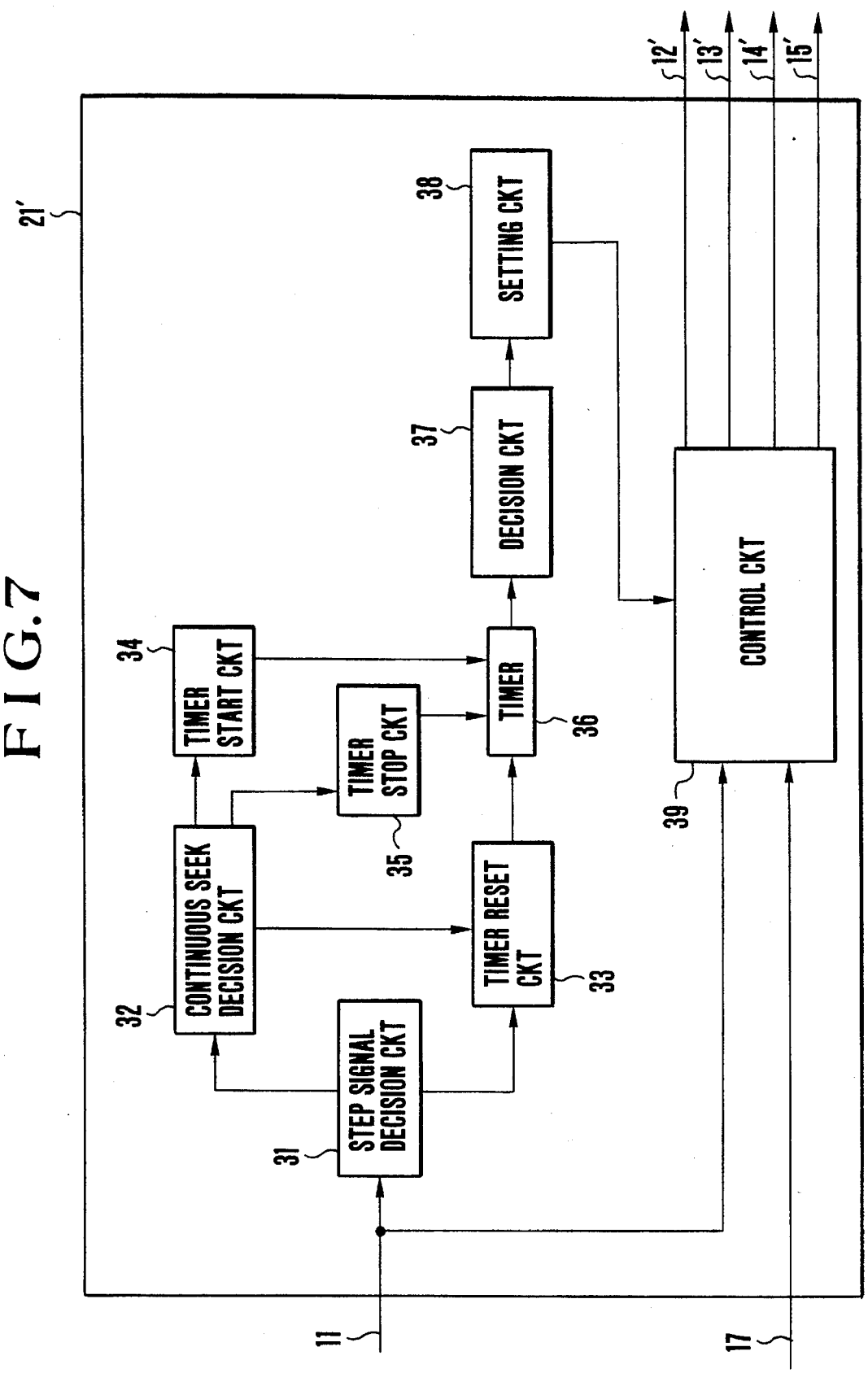
FIG. 7 is a block diagram showing by way of example a circuit for controlling the driving voltage of a head seek action on the recording/reproducing heads of a disc drive device according to this invention.
Figure 8:
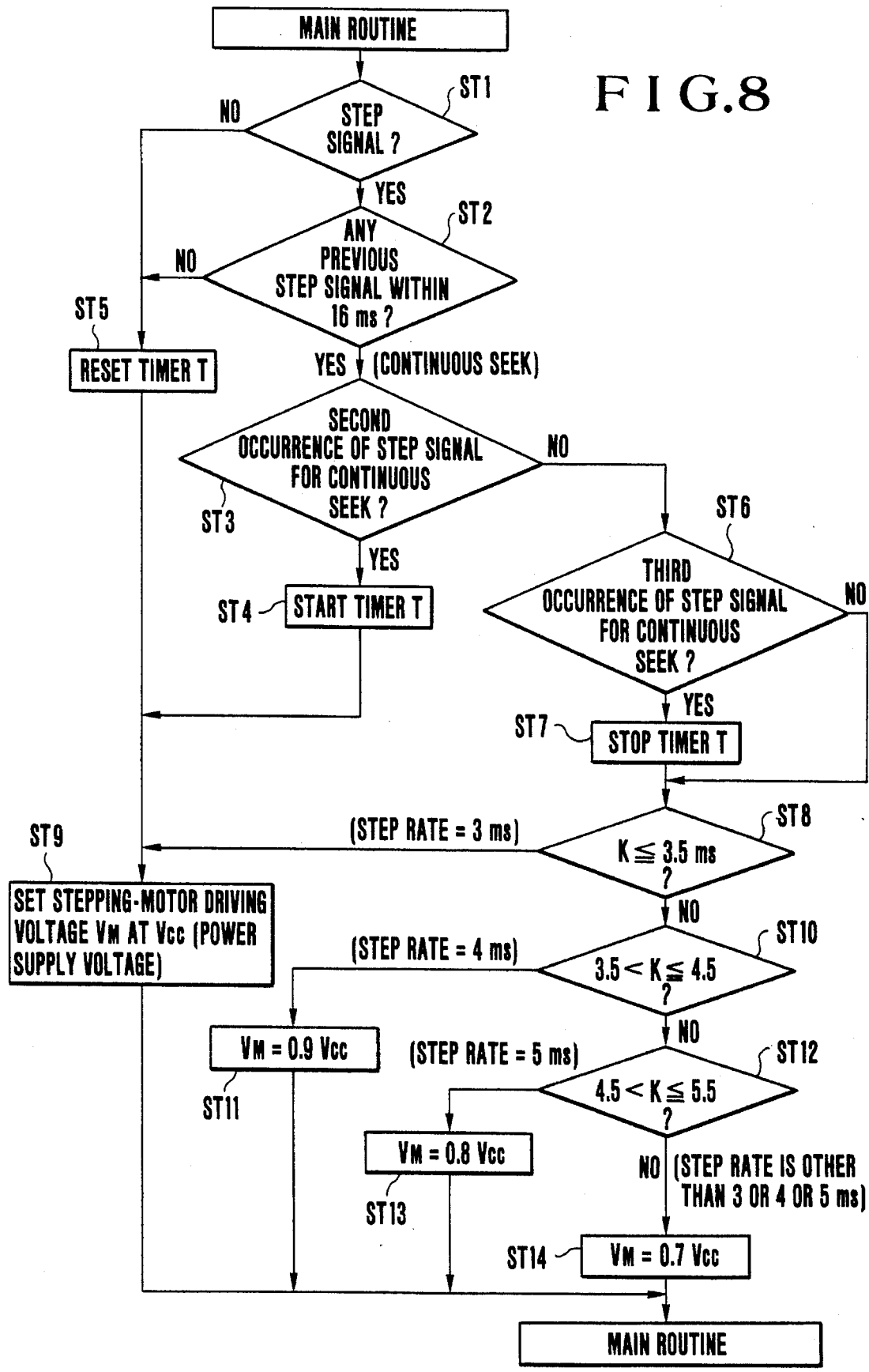
FIG. 8 is a flow chart showing the operation of the circuit shown in FIG. 7.

Next, a third embodiment of this invention is described with reference to FIGS. 3, 7 and 8. FIG. 7 is a block diagram showing by way of example a circuit arranged to control a driving voltage when the recording/reproducing head of a disk drive device of this invention performs a head seek action. FIG. 8 is a flow chart showing the operation of the device.

The third embodiment may be arranged similarly to the arrangement shown in FIG. 3. In that case, the motor driving IC 21 must be arranged as shown in FIG. 7 which shows the arrangement of a motor driving IC 21'.

The operation of the third embodiment is first described in outline as follows. Referring to FIGS. 3 and 7, a check is made to find if the step signal 11 from the host computer 30 is for a continuous head seek. If so, the period of time between the second and third pulses of the step signal 11 is counted. A count value thus obtained is considered to be the step rate of the continuous head seek. A stepping-motor driving voltage VM is decided on the basis of this step rate. The reason for using the period of time between the second and third pulses of the step signal 11 as a representative, instead of time between the first and second pulses, lies in that, although the time between the first and second pulses of the step signal is usable as the representative in principle, commercially available softwares include some softwares that make it risky to consider the time between the first and second pulses to be representing the step rate.

Referring now to FIGS. 7 and 8, the operation is described in further detail as follows. At a step ST1, a check is made by a step signal decision circuit 31 to find if an input signal 11 is a step signal. If so, the flow of operation proceeds to a step ST2. If not, the flow comes to a step ST5. At the step ST2, with the input signal found to be a step signal, a continuous seek decision circuit 32 makes a check for a continuous head seek. In other words, the check is made to find if there has been any previous step signal input within a preceding period of 16 ms. If so, the flow proceeds to a step ST3. If not, the flow comes to the step ST5 in the same manner as in the case where the input signal is found to be not the step signal at the step ST1. At the step ST5, a timer 36 is reset by a timer reset circuit 35. The reset action is performed for the purpose of bringing the timer 36 into an initial state to enable a timer start circuit 34 to start the timer 36 at a step ST4 and to start the timer 36 again after the timer 36 is brought to a stop by a timer stop circuit 35 at a step ST7, as will be described later.

At the step ST3, a check is made by the continuous seek decision circuit 32 to find if the input signal is a second pulse of the step signal for the continuous head seek. If so, the flow proceeds to the step ST4. If not, the flow comes to a step ST6. At the step ST4, the timer 36 is started. At the step ST6, the continuous seek decision circuit 32 checks the input to find if it is a third pulse of the step signal for the continuous head seek. If so, the flow comes to a step ST7 to bring the timer 36 to a stop. If not, the flow proceeds to a step ST8. In other words, at the steps ST3 to ST7, the step rate, i.e., a time interval K between the second and third pulses of the step signal is measured by means of the timer 36.

Next, the driving voltage VM is set at a voltage value suited to the step rate according to the measured time interval K between the pulses of the step signal in the following manner. At the step ST8, a decision circuit 37 checks the time interval K to find if it is less than 3.5 ms. If the time interval K is found to be, for example, 3 ms and is less than 3.5 ms, the flow comes to a step ST9. At the step ST9, the stepping-motor driving voltage VM is set at a power supply voltage VCC by a setting circuit 38. If the time interval K is found to be not less than 3.5 ms at the step ST8, the flow comes to a step ST10. At the step ST10, a check is made to find if the time interval K is above 3.5 ms and below 4.5 ms. In a case where the step rate is, for example, 4 ms and the time interval K is above 3.5 ms and below 4.5 ms, the flow comes to a step ST11. At the step ST11, the driving voltage VM is set at 0.9 VCC by the setting circuit 38. If the time interval K is found at the step ST10 to be not between 3.5 ms and 4.5 ms, the flow comes to a step ST12. At the step ST12, a check is made to find if the time interval K is above 4.5 ms and below 5.5 ms. If the time interval K is above 4.5 ms and below 5.5 ms like a step rate of 5 ms, the flow comes to a step ST13 to set the driving voltage VM at 0.8 VCC. If the time interval K is above 5.5 ms, the flow comes to a step ST14 to set the driving voltage VM at 0.7 VCC.

The output of the setting circuit 39 which is set in the above-stated manner is inputted to a control circuit 39. The control circuit 39 then generates exciting signals 12' to 15' for the phases φA to φD of the stepping motor 6 according to the input.

In the case of this embodiment, the output of the setting circuit 38 is arranged to be inputted to the control circuit 39. However, this arrangement may be changed to input the output to the power control circuit 22. Further, the method of this embodiment can be carried out solely by means of software.

As apparent from the foregoing description, in accordance with the arrangement of this embodiment, a driving voltage for a head carriage is variable according to the step rate, so that any noise caused by the head seek action can be greatly lessened. The power consumption by the stepping motor also can be minimized by the invented arrangement.

What is claimed is:

1. A method for driving a stepping motor of a disk drive device performing a head seek to move a recording or reproducing head through a succession of positions in a radial direction of a disk-shaped recording medium by driving said stepping motor according to pulses of a step signal, comprising:

a step of generating a continuous head seek step signal comprised of a succession of step pulses mutually spaced in time by a first interval;

a step of setting a period of time for exciting said stepping motor in response to each pulse of said step signal to a second interval which is shorter than said first interval and which is not shorter than a minimum length of time necessary for the head seek to move said head through said succession of positions; and a step of re-exciting said stepping motor for a predetermined period of time following excitation thereof in response to the continuous head seek signal.

2. A method according to claim 1, wherein the predetermined period of time of said re-exciting is arranged to be longer than said second interval.

3. A method according to claim 1, wherein said stepping motor is arranged to be driven by a bipolar driving method.

4. A method according to claim 3, wherein said stepping motor is arranged to be driven to move one phase thereof by one pulse of said step signal.

5. A method according to claim 1, wherein said stepping motor is arranged to be driven by a unipolar driving method.

6. A method according to claim 5, wherein said stepping motor is arranged to be driven to move two phases thereof by one pulse of said step signal.

7. A according to claim 1, wherein said step pulses are of constant voltage.

8. A disc drive device for performing a recording or reproducing action on a disk-shaped recording medium by using a head, comprising:

a) decision means for determining whether or not an inputted step signal is a continuous seek signal for a continuous head seek having two or more successive step pulses;

b) timer start means for starting a timer in response to a predetermined step pulse of the inputted step signal where the inputted step signal is determined by said decision means to be a continuous seek signal;

c) timer stop means for stopping said timer in response to a step pulse successive to said predetermined step pulse;

d) determining means for selecting a predetermined pulse interval among a plurality of pulse intervals on the basis of the length of a time interval defined jointly by said timer start means and said timer stop means; and e) setting means for setting a driving voltage for moving said head according to the pulse interval selected by said determining means.

9. A device according to claim 8, further comprising a timer reset means for resetting said timer.

10. A device according to claim 8, wherein said setting means sets the driving voltage in proportion to the pulse interval selected by said determining means.

11. A device according to claim 10, wherein the driving voltage is set in a one to one proportion to the pulse interval.

12. A method for driving a stepping motor of a disk drive device performing a head seek to move a recording or reproducing head in a radial direction of a disk-shaped recording medium by driving said stepping motor in response to pulses of step signals exhibiting respective different intervals between said pulses thereof, comprising:

a step of determining the interval between pulses of a step signal input to said disk drive device; and a step of providing further pulses for driving said stepping motor and setting a pulse amplitude of said further pulses in proportion to the determined time interval.

13. A method for driving a stepping motor of a disk drive device performing a head seek to move a recording or reproducing head through a succession of positions in a radial direction of a disk-shaped recording medium, comprising:

a step of generating a continuous head seek step signal comprised of a first succession of step pulses mutually spaced in time by a first interval, said first interval being any one of a plurality of different time periods;

a step of generating a second succession of step pulses mutually spaced in time by a second interval which is shorter than said first interval in response to pulses of said step signal;

a step of determining the time period of the first interval and setting amplitudes of pulses in said second succession of pulses in accordance with the determined time period; and a step of driving said head through said succession of positions by applying said second succession of step pulses to said stepping motor.

14. A method according to claim 13, wherein the number of pulses in said second succession is equal to the number of pulses in said first succession of step pulses.

15. A method according to claim 13, wherein said step of setting amplitudes of pulses in said second succession of pulses in accordance with the determined time period is practiced by setting a proportional relationship between the set pulse amplitude and the determined time period of said first interval.

16. In a method for driving a stepping motor of a disk drive device performing a head seek to move a recording or reproducing head through a succession of positions in a radial direction of a disk-shaped recording medium independently of positioning error in moving said head and responsively to input to said device of a continuous head seek signal comprised of a first succession of step pulses mutually spaced in time by a first interval, said first interval being any one of a plurality of different time periods, the steps of generating a second succession of step pulses mutually spaced in time by a second interval which is shorter than said first interval in response to pulses of said step signal and setting amplitudes of pulses in said second succession of pulses in accordance with the determined time period, and the further step of driving said head through said succession of positions by applying said second succession of step pulses to said stepping motor.

17. A method according to claim 16, wherein the number of pulses in said second succession is equal to the number of pulses in said first succession of step pulses.

18. A method according to claim 16, wherein said step of setting amplitudes of pulses in said second succession of pulses in accordance with the determined time period is practiced by setting a proportional relationship between the set pulse amplitude and the determined time period of said first interval.

* * * * *